Nov. 23, 1965  WILLIAM KWO-WEI CHEN ETAL  3,219,573
MULTIPLE CHAMBER ELECTRODIALYSIS APPARATUS
Original Filed Oct. 15, 1959                10 Sheets-Sheet 1

INVENTORS
WILLIAM KWO-WEI CHEN
MILTON SHELDON MINTZ
BY
William A. Drucker
ATTORNEY

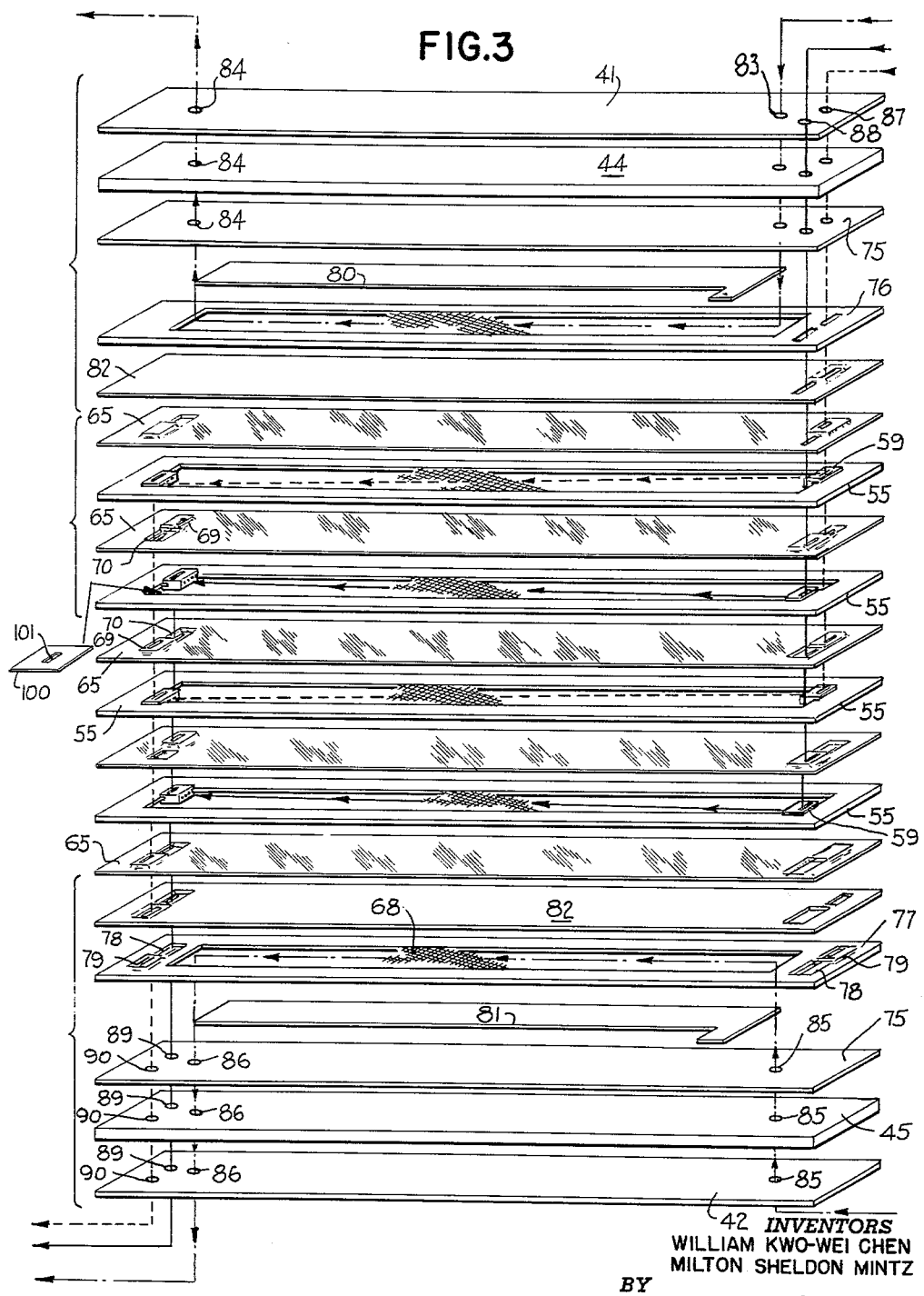

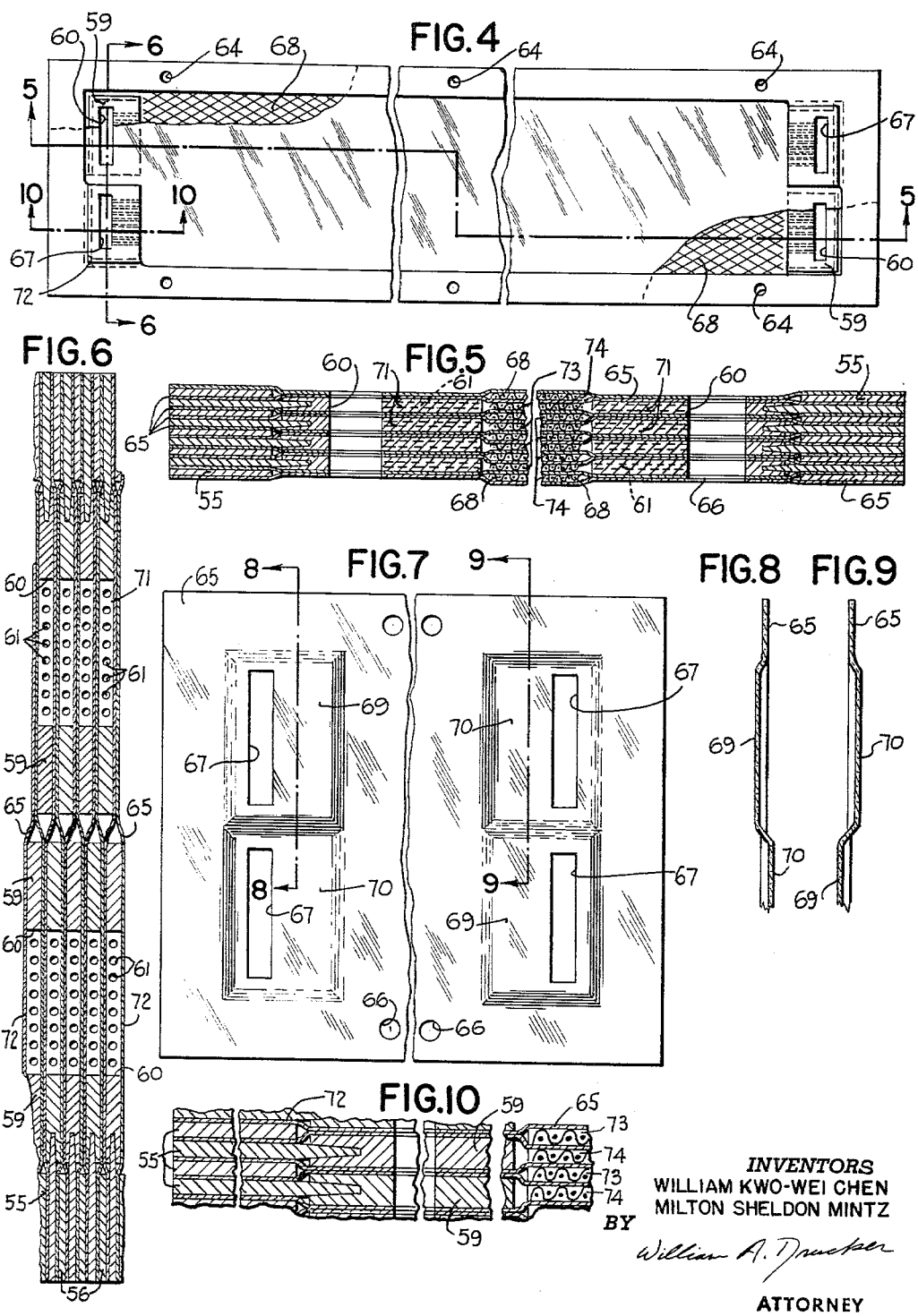

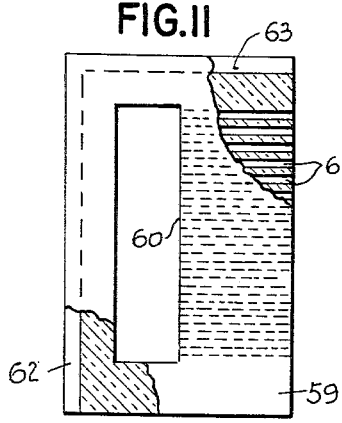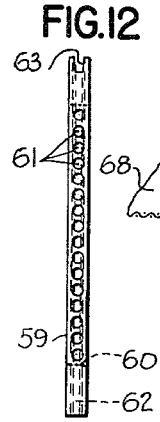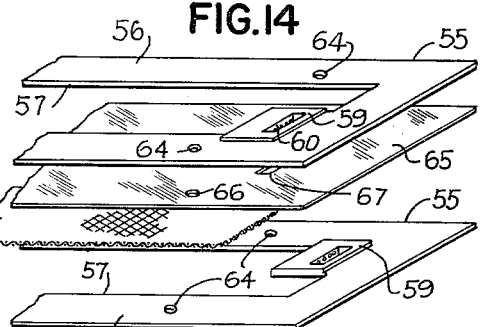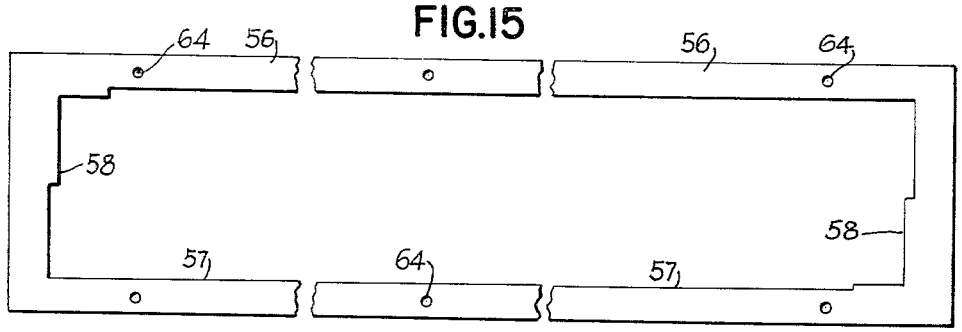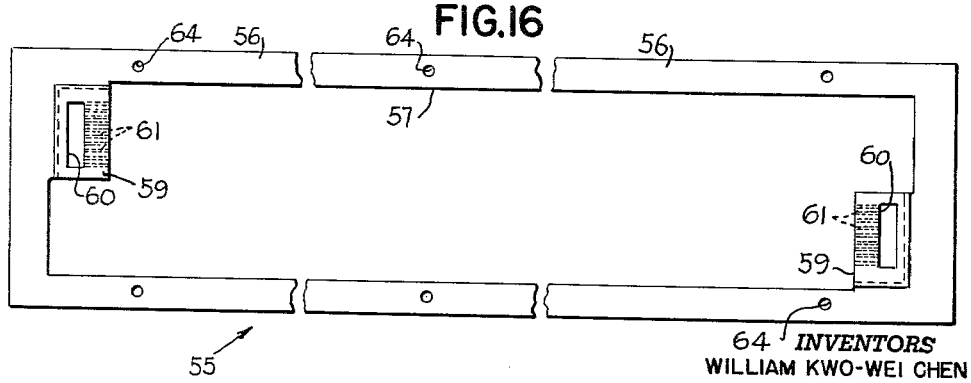

Nov. 23, 1965  WILLIAM KWO-WEI CHEN ETAL  3,219,573
MULTIPLE CHAMBER ELECTRODIALYSIS APPARATUS
Original Filed Oct. 15, 1959  10 Sheets-Sheet 5

*INVENTORS*
WILLIAM KWO-WEI CHEN
MILTON SHELDON MINTZ
BY
William A. Drucker

ATTORNEY

Nov. 23, 1965  WILLIAM KWO-WEI CHEN ETAL  3,219,573
MULTIPLE CHAMBER ELECTRODIALYSIS APPARATUS
Original Filed Oct. 15, 1959                    10 Sheets-Sheet 6
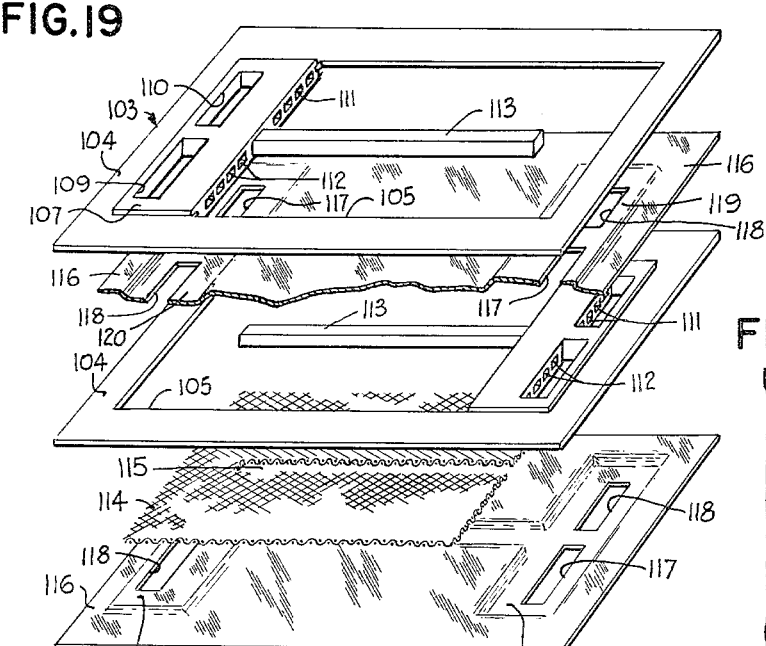
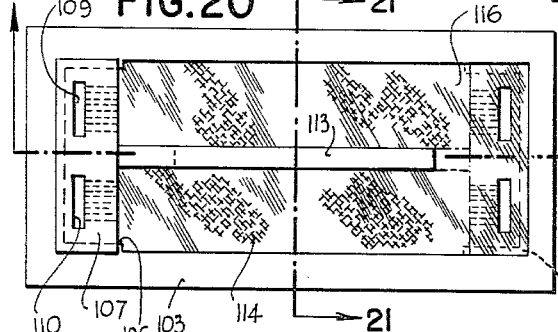
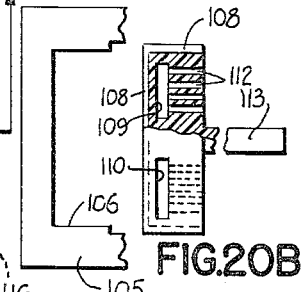
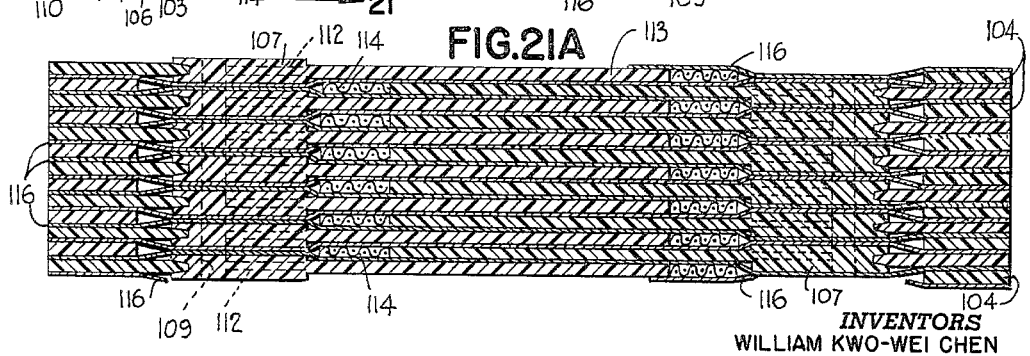
INVENTORS
WILLIAM KWO-WEI CHEN
MILTON SHELDON MINTZ
BY
*William A. Drucker*
ATTORNEY

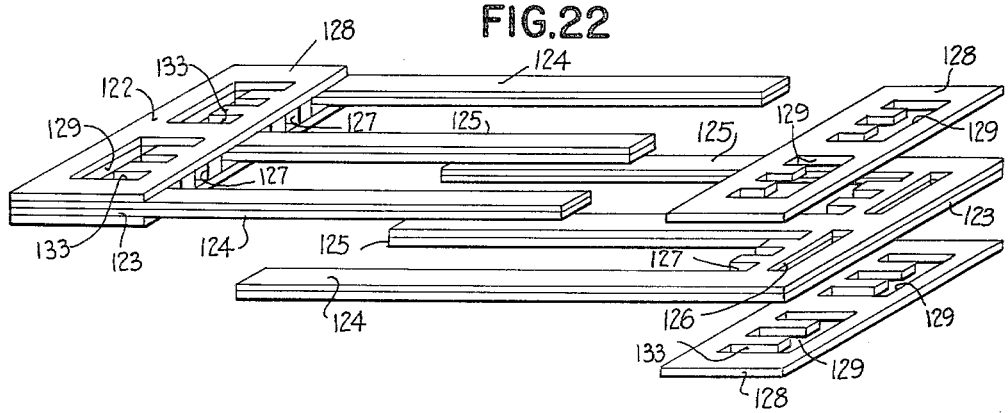
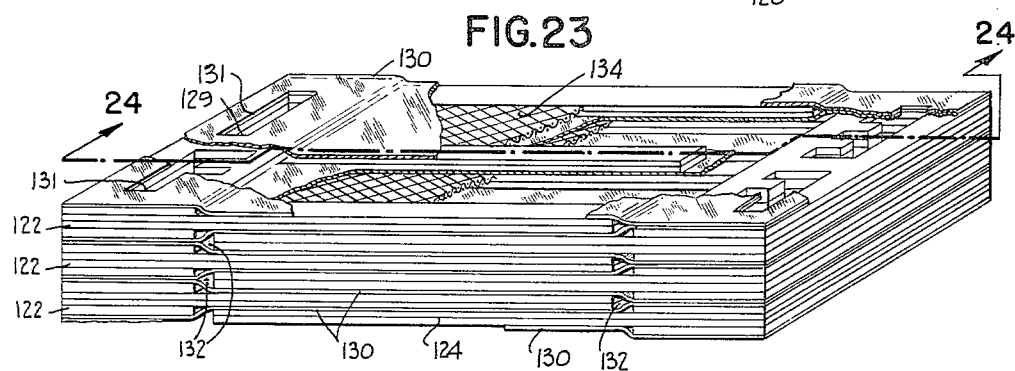
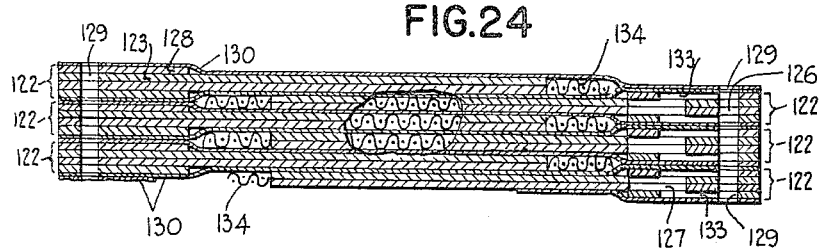

Nov. 23, 1965   WILLIAM KWO-WEI CHEN ETAL   3,219,573
MULTIPLE CHAMBER ELECTRODIALYSIS APPARATUS
Original Filed Oct. 15, 1959   10 Sheets—Sheet 8
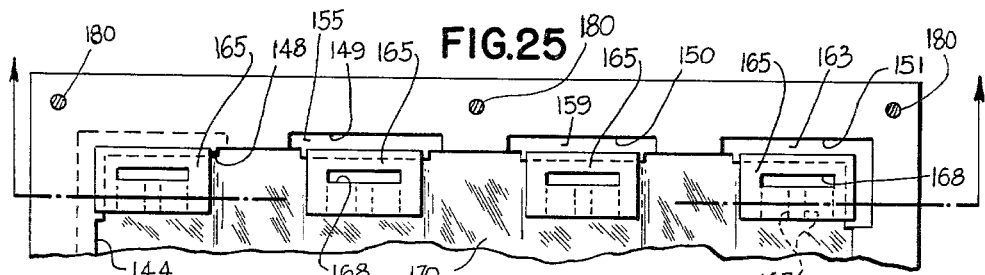
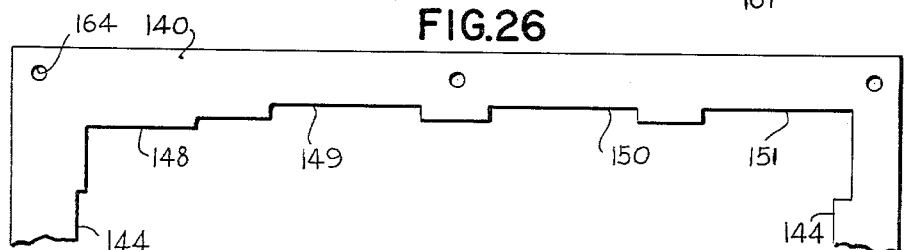
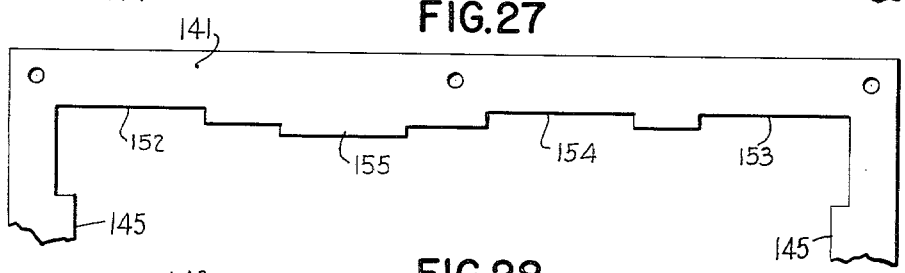
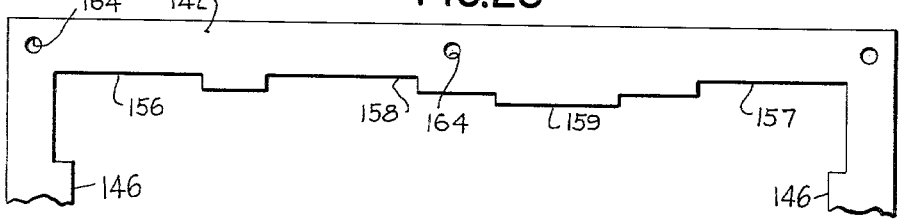
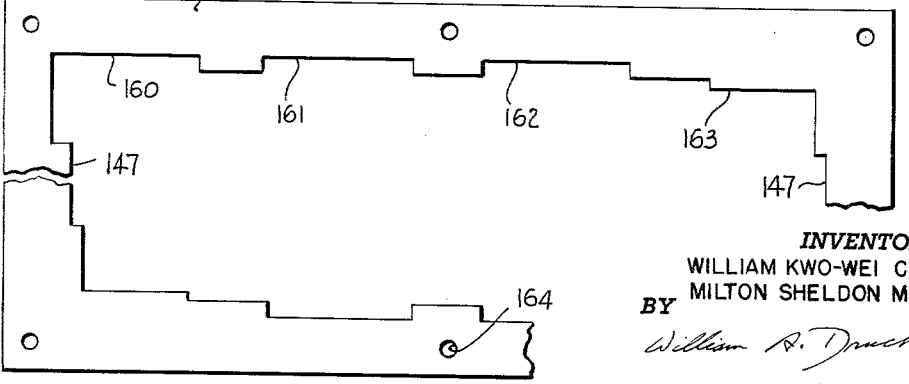
INVENTORS
WILLIAM KWO-WEI CHEN
MILTON SHELDON MINTZ
BY William R. Drucker
ATTORNEY

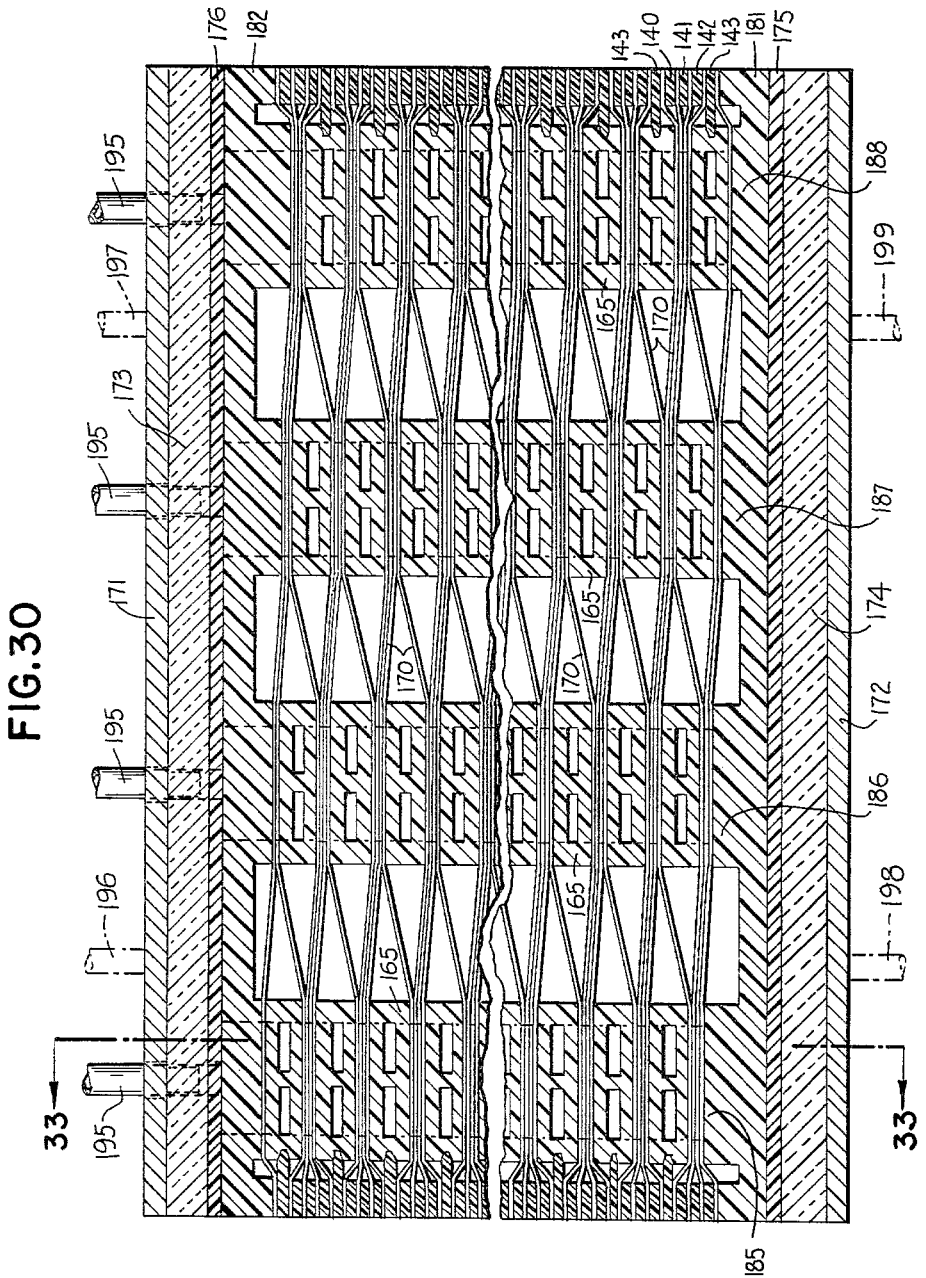

Nov. 23, 1965   WILLIAM KWO-WEI CHEN ETAL   3,219,573
MULTIPLE CHAMBER ELECTRODIALYSIS APPARATUS
Original Filed Oct. 15, 1959                     10 Sheets-Sheet 10
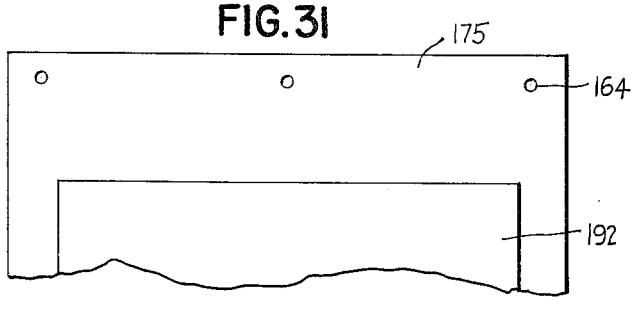
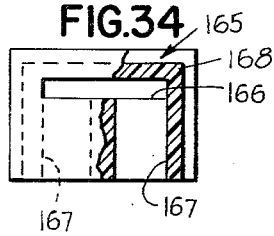
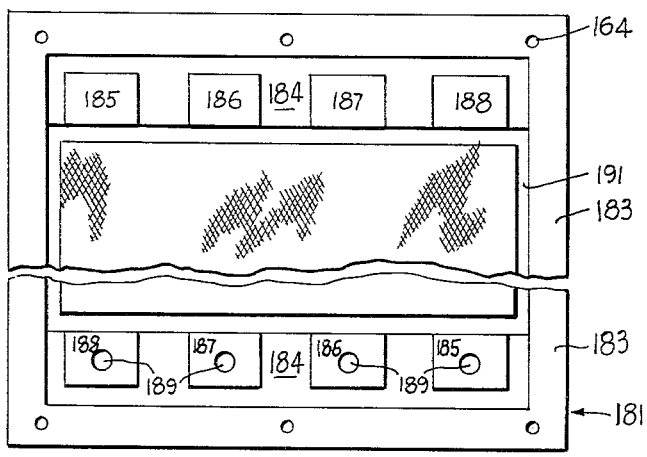
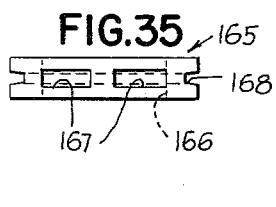
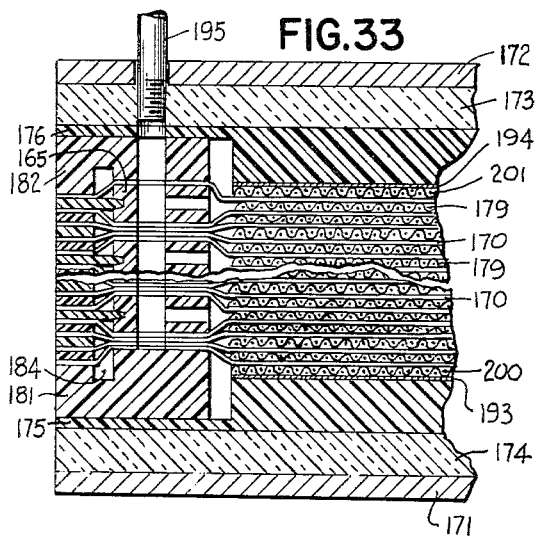
INVENTORS
WILLIAM KWO-WEI CHEN
MILTON SHELDON MINTZ
BY
ATTORNEY

United States Patent Office 3,219,573
Patented Nov. 23, 1965

3,219,573
MULTIPLE CHAMBER ELECTRODIALYSIS
APPARATUS
William Kwo-Wei Chen and Milton Sheldon Mintz, Stamford, Conn., assignors to American Machine & Foundry Company, a corporation of New Jersey
Continuation of application Ser. No. 846,674, Oct. 15, 1959. This application May 1, 1963, Ser. No. 282,526
16 Claims. (Cl. 204—301)

This invention relates in general to multiple chamber fluid treatment devices, particularly to the construction of cell stacks and the manifolding of the individual cells within the stacks, and is a continuation of copending application Serial No. 846,674, filed October 15, 1959, now abandoned.

For purposes of this invention, which equally applies to dialysis, electrodialysis is to be regarded as merely a special case of dialysis utilizing electrical energy. Electrodialysis apparatus, for example, may consist of stacks of alternating membranes and gasket spacer elements which are clamped together between a pair of end electrodes. The membranes are thus positioned by the gaskets to form cells between adjacent pairs of membranes within cut out portions of the gaskets. These gaskets may be between .01 and 0.2 inch thick. A greater thickness would tend to space the membranes too far apart and would overly increase the electrical resistance within the stack while a lesser thickness would tend to space the membranes too close together which would overly increase the hydraulic resistance to fluid flow through the individual electrodialysis cells.

Cells of this type are usually manifolded by aligned apertures which form manifold passages passing through the stack of gaskets and membranes. The appropriate intake and exhaust manifold passages are usually connected to particular cells by slots cut completely through the gaskets which communicate between the central cut out portions and the manifold apertures. One major disadvantage which may result from such construction is that the pairs of membranes on each side of such a cut out slot may flex into the slot as these membranes are only a few thousandths of an inch thick and may be quite flexible. Such flexing into a slot allows fluid to flow past the edge of a membrane and behind it, between the membrane and an unslotted portion of an adjacent gasket. Since a cell stack in electrodialysis, for example, consists of an alternating series of diluting and concentrating cells, flexing of a membrane into a slot may allow some fluid from a given manifold to flow into the wrong exhaust manifold.

Another manner in which the manifold passages may be connected to the cut out portions forming the electrodialysis cells within the gaskets is by providing internal passages within the gaskets leading from the manifold apertures to the cut out portion. Since these internal passages cannot be larger than the thickness of the gasket, they offer a large hydraulic resistance to fluid flow through them. Furthermore, if, as an example, the passages are .020 inch high in a gasket that is .040 inch thick, the walls above and below the passages on each side of the gasket supporting a membrane are only .010 inch thick and may flex inward to some degree allowing slight leakage into the wrong cell or manifold passage.

It is, therefore, an object of this invention to construct a cell stack in which the portions of the gaskets containing the manifold passages are thicker than the thickness of the portions of the gaskets spacing the membranes apart to form cells. Additional thickness of the gaskets where they contain the manifold passages allows larger internal passages to be formed with correspondingly lower hydraulic resistance and with greater structural strength to resist any flexing into the internal passages.

Another object of this invention is to provide a cell stack structure which has a lower hydraulic resistance to fluid flow from its manifold passages into its cells while providing more rigid support for the flexible membranes which form the cells.

Still another object of this invention is to provide more easily assembled and fabricated gaskets consisting of two parts, a frame member containing assembly indexing apertures and which may be stamped from stock material and a thicker manifold button which may be easily molded and attached to the frame member.

Yet another object of this invention is to provide a hydraulic path within each cell in the form of a return bend. This doubles the distance of travel within a cell for a given gasket length.

A further object of this invention is to provide a cell stack in which there is a reduced possibility of leakage from a given cell or manifold into the wrong cell or manifold and in which there is less likelihood of leakage outside the stack.

A still further object of this invention is to provide a cell stack in which the thickness of the portions of the gaskets containing the manifold apertures is approximately an integer multiple of cell thickness with the resulting advantages of more rugged construction and larger internal passages communicating between the manifold apertures and the cells. The larger apertures naturally give rise to lower hydraulic resistance within the stack.

Many more objects, advantages and features of invention reside in the construction, arrangement and combination of parts involved in the embodiments of the invention and its practice, as will be understood from the following description and accompanying drawing wherein:

FIG. 3 is an exploded perspective view of the elements forming an electrodialysis stack according to this invention;

FIG. 4 is a plan view of a stack of gaskets and membranes with two central portions broken away and with two corners of the upermost membrane broken away to show a gasket and a spacer screen beneath it;

FIG. 5 is a section taken on line 5—5 of FIG. 4;

FIG. 6 is a section taken on line 6—6 of FIG. 4;

FIG. 7 is a plan view of a membrane, with its center broken away, as it would appear while deformed within an assembled stack according to this invention;

FIG. 8 is a section taken on line 8—8 of FIG. 7;

FIG. 9 is a section taken on line 9—9 of FIG. 7;

FIG. 10 is a section taken on line 10—10 of FIG. 4;

FIG. 11 is a plan view of a manifold button partly broken away in section to show its interior construction;

FIG. 12 is a front view of the manifold button;

FIG. 13 is a side view of the manifold button;

FIG. 14 is an exploded perspective view of two gaskets with a membrane and a spacer screen shown in position between them;

FIG. 15 is a plan view of a gasket frame member with two central portions broken away;

FIG. 16 is a plan view of a gasket frame member with two manifold buttons shown in position and with two central portions broken away;

FIG. 19 is an exploded perspective view of two gaskets forming a third embodiment of this invention with two membranes and a screen spacer shown in position;

FIG. 20 is a plan view of a stack of gaskets and membranes according to the third embodiment of this invention;

FIG. 20a is a plan view of an end portion of a frame member used in forming the third embodiment of this invention;

FIG. 20b is a plan view, partly broken away in section, of the manifold button used with the third embodiment of this invention;

FIG. 21 is a section taken on line 21—21 of FIG. 20;

FIG. 21a is a section taken on line 21a—21a of FIG. 20;

FIG. 22 is a perspective view of two gaskets forming a fourth embodiment of this invention with one of the gaskets partially exploded to show its construction;

FIG. 23 is a perspective view of an assembled stack of gaskets and membranes according to the fourth embodiment of this invention with part of the uppermost membrane and screen spacer broken away to show interior construction;

FIG. 24 is a section taken on line 24—24 of FIG. 23 with a small portion further broken away in section to show interior construction;

FIG. 25 is a top view of a fragment of one end of a stack of gaskets and membranes forming a fifth embodiment of this invention;

FIG. 26, 27, 28 and 29 are plan views of fragments of four frame members used in the fifth embodiment of this invention;

FIG. 30 is a cross section of a cell stack formed according to the fifth embodiment of this invention as it would appear taken on line 30—30 of FIG. 25;

FIG. 31 is a plan view of a fragment of one end of a buttonless gasket with a portion of an electrode screen spacer shown in position as they would appear in the fifth embodiment of this invention;

FIG. 32 is a top view of a fragment of one end of the lower button spacing gasket with a portion of the lower electrode screen spacer shown in position;

FIG. 33 is a section taken on line 33—33 of FIG. 30;

FIG. 34 is a plan view of a manifold button, partly broken away in section to show its interior construction, as used in the fifth embodiment of the invention;

FIG. 35 is a front view of the manifold button; and

FIG. 36 is a side view of the manifold button.

Figure 1:
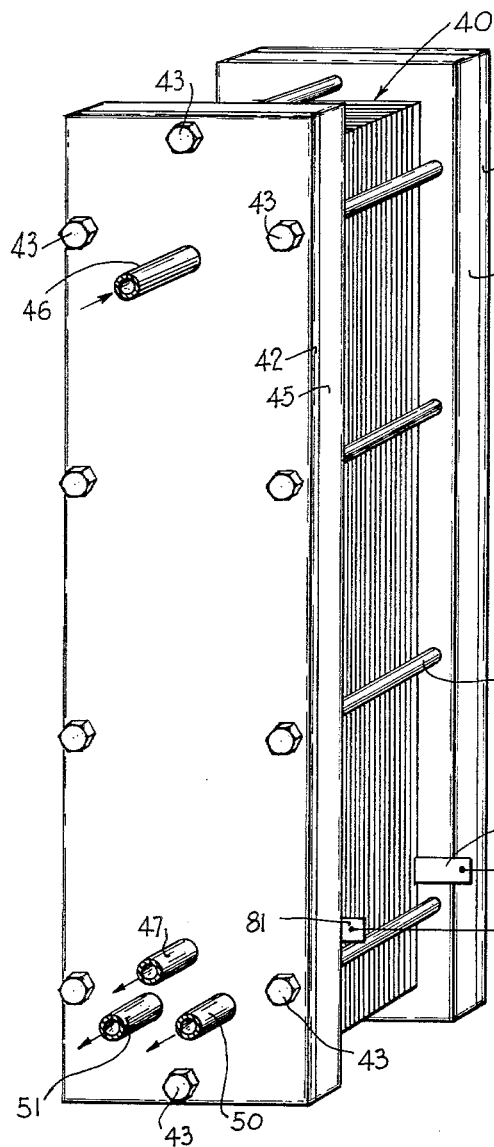
FIG. 1 is a perspective view of an electrodialysis stack.
Figure 2:
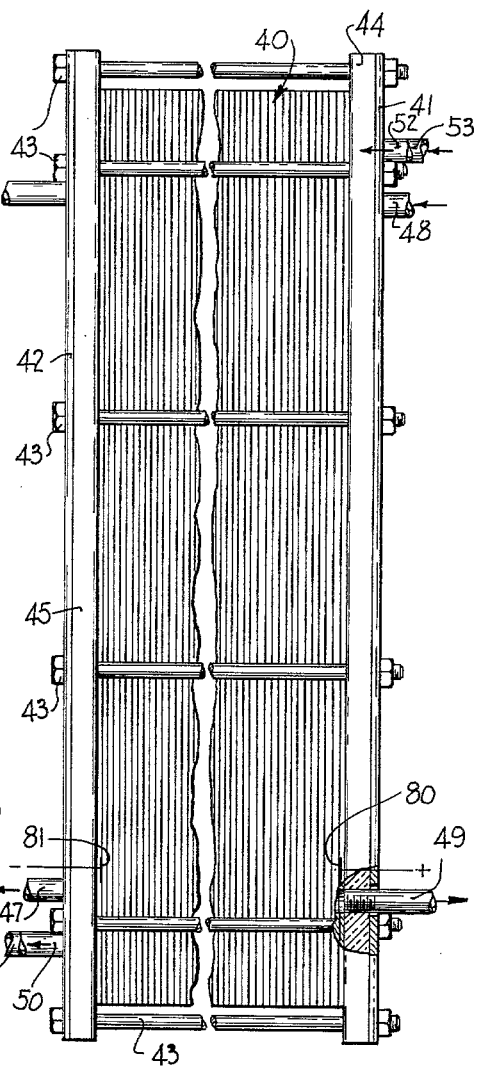
FIG. 2 is a side view of an electrodialysis stack with a central portion broken away and with a small additional portion broken away in section to show internal construction.

Referring to the drawings in detail, FIGS. 1 and 2 show an assembled electrodialysis stack, generally designated by the numeral 40, which is clamped between two steel end plates 41 and 42 which are drawn together as the bolts 43 are tightened. Heavier blocks of insulating material 44 and 45 may be disposed inside the end plates 41 and 42. It is to be noted that the steel end plates extend and the bolts 43 are disposed beyond the periphery of the stack 40 and electrically insulated from it. The end plate 42 and the block 45 have the cathode washing stream intake and exhaust pipes 46 and 47 extending into them, while the end plate 41 and the block 44 have the anode washing stream intake and exhaust pipes 48 and 49 fixed into them. The end plate 42 also receives the product stream pipe 50 and the concentrate stream pipe 51. In a like manner, the end plate 41 receives the two intake stream pipes 52 and 53. The pipes 46, 47, 48, 49, 50, 51, 52 and 53 of FIGS. 2 and 3 lead to apertures formed in the elements comprising the stack 40.

FIG. 16 shows a gasket 55 forming a first embodiment of this invention. This gasket 55 consists of three elements one of which is the frame 56 shown in FIG. 15. This frame is generally rectangular in shape with a central rectangular opening. Two oppositely disposed corners have the inward extensions 58. The frames 56 also contain the alignment apertures 64 which are used to align the gaskets 55 when they are asembled in a cell stack.

As shown in FIGS. 11 through 13, small rectangular manifold buttons 59 are formed approximately twice the thickness of the frames 56. Extending through these buttons 59 are the large manifold apertures 60. Small internal passages 61 extend from each manifold aperture 60 toward the inwardly disposed edge of the button 59. Along the outwardly disposed edge of the button 59 and along one side there extend the slightly tapered channels 62 and 63. The frames 56 may be made of plasticized polyvinyl chloride or a softer plastic such as polyethylene, or they may be rigid, as the softer interspersed membranes will act as gaskets to seal them. The buttons 59 are preferably of an inert rigid plastic. When two buttons 59 are assembled within the frame 56 to form a gasket 55, as seen in FIG. 16 the tapered channels 62 and 63 are force fitted over the corner extensions 58 of the frame 56. They may then be glued or otherwise secured in place. The advantage of this construction is that after the manifold button is attached to the gasket frame, there will be only one component instead of having to assemble several washers, corrugated spacers and gaskets as in other well known devices of this type.

When the gaskets 55 are assembled as shown in FIG. 14, membranes 65 are placed between them. These membranes 65 contain alignment apertures 66 which correspond to the aligment apertures 64 in the frames 56 and they also contain two manifold apertures 67 at each end corresponding to the manifold apertures 60 in the buttons 59. A rectangular screen spacer 68 lies in the rectangular cut out portions 57 of each gasket 55 and extends between the inner edges of the buttons 59 leaving a rectangular unfilled space next to each button 59. Since alternate gaskets are stacked in inverted positions, the buttons 59 on the gaskets 55 above and below a given gasket extend into these unfilled spaces.

Referring to FIGS. 4 through 10, the actual configuration of these elements when assembled in a stack may be seen. The edge of the cut out portion 57 of each frame extends beyond the outer edges and ends of the buttons 59 on the gaskets above and below it. The stack is built up with alternate layers of membranes 65 and gaskets 55 so that, when the gaskets 55 are clamped together, alternate membranes are distorted as shown in FIG. 7. On each end of each membrane one button 59 pushes a portion 69 upward while another button distorts a portion 70 downward.

FIGS. 5 and 6 show that a membrane 65 extends between each pair of adjacent frames 56, but that each pair of adjacent manifold buttons clamps two membranes between them. Therefore, as shown in FIG. 6, the internal passages 61 in a given stack 71 of buttons 59 communicate between pairs of membranes 65, forming alternate fluid compartments or cells while the adjacent stack 72 of buttons 59 has passages 61 which communicate between pairs of membranes 65, forming the intervening cells. Fluid cannot then flow from the stack 71 of buttons 59 to the stack 72 of buttons 59 because the membranes forming cells into which fluid may flow from the stack 71 are clamped between the buttons of the stack 72. However, as shown in FIG. 5, fluid may flow from the stack 71 to the oppositely disposed stack 71 through the cells 73 formed between adjacent pairs of membranes, but fluid cannot flow through the cells 74 from the stack 71 as the membranes forming these cells 74 are pinched together by buttons 59 of the stack 71. Only the button stack 72 connects with the cells 74 just as the stack 71 connects with the cells 73. Thus fluid enters and exhausts from the opposite stack 72 of buttons 59 to flow through the intermediate cells 74.

Referring to FIG. 3, the assembled electrodialysis stack consists of the following elements. Between the metal end plates 41 and 42 are the plastic insulating blocks 44 and 45 and the corrosion resistant sheets 75. Adjacent to upper and lower sheets 75, is a top gasket 76 and a bottom gasket 77. These gaskets contain no buttons but extend over the area usually occupied by the buttons. The outwardly disposed surfaces of these gaskets 76 and 77 are flat to conform to the upper and lower flat sheets 75, but the inner surface of these gaskets 76 and 77 in the area usually occupied by the buttons has an indentation 78 where a button 59 projects outward and a projection 79 where there is an area not occupied by a button. Within the gaskets 76 and 77 there are screen spacers 68 and an anode 80 and a cathode 81. Inert porous mats 82 protect the adjacent membranes 65. Within the upper end plate 41, the insulating block 44 and the sheet 75, there are formed the anode washing intake apertures 83 and the anode washing exhaust apertures 84. In a like manner, within the lower end plate 42, the insulating block 45 and the sheet 75, there are formed the cathode washing intake and exhaust apertures 85 and 86. Therefore, fluid forced into the anode and cathode washing intake apertures 83 and 85 can only exhaust through the apertures 84 and 86. This flow removes corrosive materials which may be liberated at the anode 80 or the cathode 81 during operation of the stack.

The membranes 65 are alternately anion and cation permeable so that alternate diluting and concentrating cells are formed within alternate gaskets 55. The cell stack operates in the conventional manner with two intake streams flowing into the apertures 87 and 88 while a concentrating and a diluting or product stream flow out of the apertures 89 and 90.

The raised portions 69 and the lowered portions 70 of the membranes 65 may be formed in the membranes 65 if they are of sufficiently elastic material when they are compressed between the gaskets 55. If the membranes 65 are not sufficiently elastic to form these raised and lowered portions, these portions may be preformed in the membranes with heated dies under pressure or in any other suitable manner. Since the inert porous mat 82 must also have raised and lowered portions to correspond to the adjacent buttons 59, these raised and lowered portions may be preformed in the porous mats also.

Figure 17:
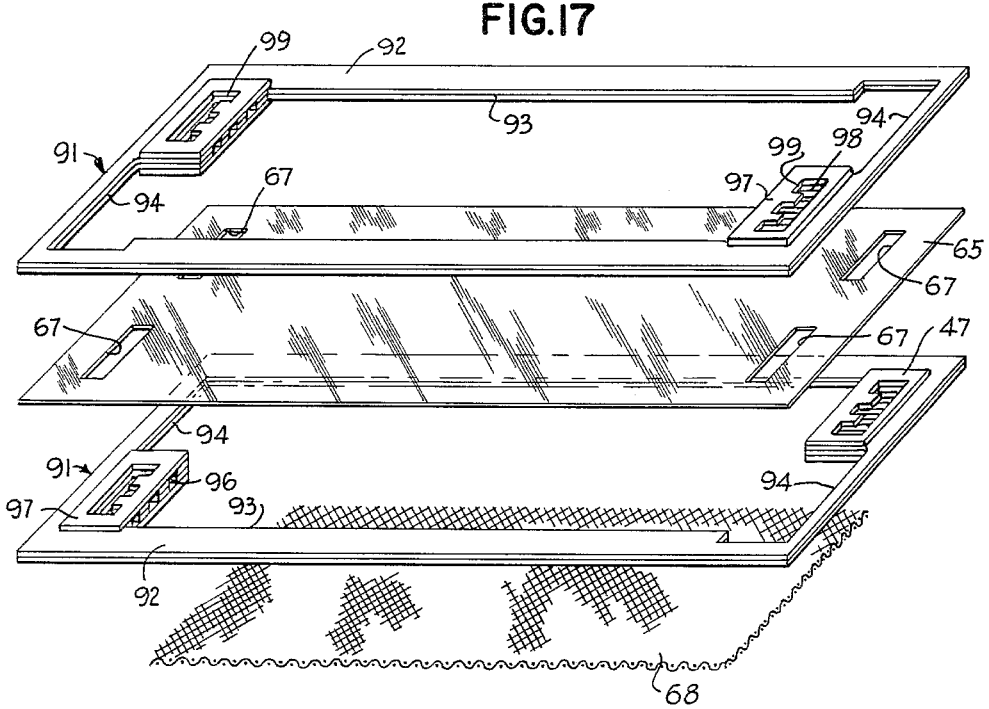
FIG. 17 is an exploded perspective view of two gaskets formed according to a second embodiment of this invention with a membrane and a screen spacer shown in position.
Figure 18:
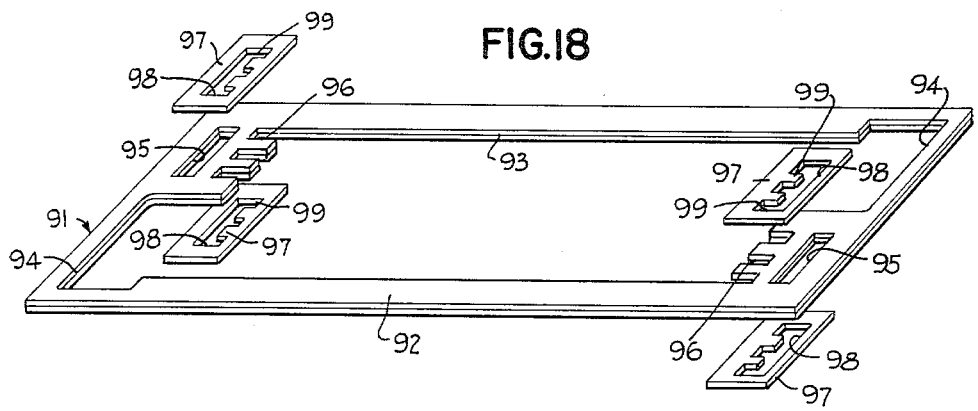
FIG. 18 is an exploded perspective view of the elements forming the laminated gasket of the second embodiment of this invention.

FIG. 18 shows the second embodiment of this invention wherein a laminated gasket 91 is formed from two laminated center pieces 92. Each of these center pieces 92 contains a large rectangular cut out portion 93 and two diagonally oppositely cut out corners 94 formed at the ends of the central opening 93. The other two corners of the pieces 92 contain the manifold passages 95 and the longitudinal notches 96 extending toward the passages 95 from the central cut out portion 93. The upper and lower button laminates 97 each contain a manifold aperture 98 with longitudinal slots 99 extending from it. When the button laminates 97 are glued or otherwise fixed in position as shown in FIG. 17, the passages or slots 99 extend over the deepest portion of the slots 96 so that fluid may flow from the manifold passages formed by the apertures 95 and 98 over the center laminates 92 within the notches 99 and then between the button laminates 97 in the slots 96. As shown, the center laminates 92 and the button laminates 97 are of the same thickness to insure that the manifold button portions will be exactly twice the thickness of the frame portions of the gaskets. However, should it be desired, the center laminates 92 may be formed of one piece which is twice the thickness of each button laminate 97. These laminated gaskets 91 are assembled in the same manner as has been described for the first embodiment of this invention. FIG. 17 shows how alternate layers of the gaskets 91 and the membranes 65 are built up with each gasket containing a screen spacer 68.

Referring again to FIG. 3, if the uppermost membrane 65 is a cation permeable membrane, the first or uppermost cell after the electrode cell will be a concentrating cell. Next there will follow a diluting cell, then another concentrating cell, and so on throughout the cell stack.

Now referring to FIGS. 5 and 6, it may be seen that the membranes bounding any given cell are brought together at opposite corners between two manifold buttons 59 of the stack of such buttons which does not conduct fluid to or from the given cell.

Since the electrodialysis apparatus functions by passing an electrical current through the series of electrodialysis cells and the concentrating cells have a lower electrical resistance, the current density may tend to increase at those areas where their membranes are brought together. This may necessitate the placing of insulating shims 100 between these membranes where they are brought together. Such an insulating shim 100 is shown in FIG. 3 with the manifold aperture 101 formed in it. For even construction and to preserve symmetry, these shims 100 may be placed at every point of contact between adjacent membranes 65. In such a case, the buttons 59 would be reduced in thickness according to the thickness of the insulating shims 100. For example, if the shims were .010 inch thick and the frames 56 were .040 inch thick, the buttons would then have to be .070 inch thick.

FIGS. 19, 20, 20a, 20b, 21 and 21a show a third embodiment of this invention. Return path gaskets 103 are assembled from a frame 104 containing a large rectangular opening 105, one end 106 of which is reduced in size. A double manifold button 107 shown in FIG. 20b has a groove 108 extending along its outer edge and sides so that the button 107 may be fixed to the frame 104 by forcing the inner edge of the end 106 of the frame 104 into this groove. The button 107 contains the two manifold apertures 109 and 110 and the smaller internal passages 111 and 112 which extend from the manifold apertures to the inner edge of the button.

The button 107 is approximately twice the thickness of the frame 104 while the centrally located divider arm 113 is the same thickness as the frame. When the gaskets 103 are assembled as shown in FIG. 19, alternate gaskets 103 are rotated through 180 degrees in the horizontal plane. Thus each button 107 of a gasket 103 extends partly within the frames 104 of the gaskets 103 and above and below it, while the ends of the divider arms 113 of adjacent gaskets 103 overlap. Screen spacers 114 are assembled within each return path gasket 103. These screen spacers contain the cut out slots 115 to accommodate the divider arms 113. When the stack is assembled, the membranes 116 have an upwardly deformed area 119 above a button 107 and a downwardly deformed area 120 below a button. The membranes 116 also may contain the pairs of manifold apertures 117 and 118 at each end.

However, membranes may also be used which contain no holes for fluid flow by providing separate manifold spacer elements containing fluid flow apertures beyond the membrane edges.

A return bend construction of an electrodialysis stack gives rise to several advantages. First, alternate concentrating and diluting cells have their inlet and outlet manifold passages at opposite ends of the gaskets rather than in close proximity to each other. A second advantage is that the return bend effectively doubles the demineralization path length for a given gasket length. Another important advantage of this sort of stack assembly is that cross-leak is eliminated or substantially reduced because alternate pairs of membranes are brought into intimate contact between the manifold buttons at each end of the stack. This prevents undesired fluid flow into or out of the cells formed by these membranes.

FIGS. 22, 23, and 24 show a fourth embodiment of this invention wherein return path gaskets 122 are constructed as U-shaped frames with centrally located dividers. Center laminates 123 have two longer outside legs 124 and a shorter center leg 125. Pairs of manifold apertures 126 pass through the base of the center laminates 123 and slots 127 extend from the edge of the base toward the manifold apertures 126. Button laminates 128 contain manifold apertures 129 corresponding to those in the center laminates 123. They also contain slots extending forward from the apertures 129. These button laminates 128 are glued or otherwise fixed over the base of the center laminates 123 so that fluid can flow from the manifold passages formed by the apertures 126 and 129 through internal passages formed by the slot 127 in the same manner that has been described for the second embodiment of this invention.

When layers of alternately reversed gaskets 122 are built up interspersed with membranes 130 containing manifold apertures 131, a stack such as that shown in FIGS. 23 and 24 results. External leakage through the openings 132 in the sides of the stack may be prevented by caulking with a suitable compound. This embodiment of the invention is very inexpensive to construct and it enjoys all the advantages of the third embodiment except that it may be more likely to leak externally. However, external leakage is not always a primary consideration in the construction of this equipment.

FIGS. 25 through 36 show a fifth embodiment of this invention. Four frame members 140, 141, 142 and 143 are shown in FIGS. 26 through 29. These frames 140, 141, 142 and 143 are generally rectangular with the large rectangular cut out portion 144, 145, 146 and 147 formed in their centers. Each end of the frame 140 has a corner 148 which is cut out to a lesser degree, two deeper cut notches 149 and 150, and a deeper cut corner 151. The frame 141 has at each end the two deeper cut corners 152 and 153, the deeper cut notch 154, and the projection 155 extending inward from the end of the frame. In a like manner, the frame 142 has the two deeper cut corners 156 and 157, the deeper cut notch 158, and the projection 159, while the frame 143 has at each end the deeper cut corner 160, the notches 161 and 162, and the corner 163 which is cut out to a lesser degree. It is to be noted that the frames 142 and 143 are identical to the frames 140 and 141 in the inverted position. It should also be noted that, in any given frame, either the corners which are cut out to a lesser degree or the projections which extend inwardly from the end of the frame are disposed diagonally opposite to each other as shown in FIG. 29.

Referring to FIGS. 34, 35 and 36, generally rectangular manifold buttons 165 are formed four times the thickness of the frame members 140, 141, 142 and 143. A single manifold aperture 166 extends through each button 165. Internal passages 167 extend from this manifold aperture to the front edge of the button while a mounting slot 168 of the same width as the edge of a frame extends along the center of the back edge and around the sides of the manifold button 165.

The frames 140 and 143 have the manifold buttons 165 fixed in their corners 148 and 163 by forcing the inner edge of these corners 148 or 163 into the appropriate portions of the slots 168 of a button 165. In a like manner, a button is fixed within each end of the frames 141 and 142 by forcing the projections 155 or 159 into the slot 168 in the back of a button 165.

Referring now to FIG. 25, a cell stack is assembled by arranging alternating layers of gaskets with interspersed membranes 170. Each gasket consists of a frame with two manifold buttons attached, one at each end. The membranes 170 are generally rectangular and coextensive with the frames and contain four manifold apertures at each end. If the alignment apertures 164 in the frames are used in the assembly of a stack by sliding the frames downward about alignment rods 180, the membranes 170 must also contain corresponding alignment apertures to accommodate these rods.

As is shown in FIG. 25, the frame 143 is first slipped downward over the rods 180 followed by a membrane 170. Then the frame 142 follows with a button 165 of the frame 143 extending into the cut out corner 157 of the frame 142, while the button 165 on the frame 142 extends downward into the notch 162 of the frame 143. Another member 170 and the frame 141 follow with the button 165 on the frame 141 extending into the notches 158 and 161 of the frames 142 and 143. Then another membrane 170 and the frame 140 are placed on the stack with the button 165 on the frame 140 extending downward into the deeper cut corners 152 and 156 of the frames 141 and 142. Since another membrane 170 and a second frame 143 could be placed on top of the frame 140 as it is shown, a stack is built up in this manner.

As shown in FIG. 33, between each vicinal pair of membranes there is a rectangular spacer screen 179 which extends with slight clearance between the sides of the frame within which it fits and between the fronts of the buttons 165 at each end of the frame. As shown, the membranes 170 must be distorted to flex about the manifold buttons. If the membranes are not sufficiently flexible, they may be preformed so that they fit into position.

Each stack of these manifold buttons 165 has a manifold passage formed within it communicating with every fourth cell. For this reason, a single common manifold passage cannot feed alternate cells. However, with external manifolding, the product and dilute streams from two manifold passages may be combined for a single stack.

FIG. 32 is a plan view of a base spacer member 181 which has the raised edge 183 and the two lower end portions 184. Four blocks 185, 186, 187 and 188 of the size of the manifold buttons 165 are raised from each end portion 184 to the appropriate height as shown in FIG. 30 to support the stacks of buttons 165. One set of these blocks contains the manifold apertures 189. The cover spacer member 182 is identical to the base spacer member in the inverted position.

Below and above the spacer members 181 and 182 there may be seen the spacers 175 and 176. The spacer 175 is shown in FIG. 31 with a raised portion 192. The cut out portion 191 of the base spacer member 181 and the raised portion 192 of spacer 175 forms the cathode chamber 200 and contains the cathode 193 which may be seen in FIG. 33. In a like manner, the cover spacer 182 and spacer 176 form an anode chamber 201 and contain the anode 194. Spacer members 175 and 181, and spacer members 176 and 182 may be integrally formed by a molding process or formed by an alternate laminate assembly. The raised portions 185, 186, 187, and 188, for example, may be the laminates while the remainder of the spacer assembly 175 and 181 is integrally formed. A feature of this embodiment is that the offset created by the staggered groups of manifold buttons are separately compensated at each end of the stack.

FIG. 30 shows the intake pipes 195 which connect to the manifold passages formed in the four stacks of buttons 165 by the aligned manifold apertures 166 in them. However, the anode and the cathode washing intake and exhaust pipes 196, 197, 198 and 199 are indicated by dotted lines only, to show their relative positions, as they would not normally appear in this section. Rigid end plates 171 and 172 and insulating blocks 173 and 174 serve the same function as those described in the first embodiment of this invention.

In the first embodiment of this invention, as shown in FIG. 3, insulating shims 100 are needed in some applications where the membranes are brought together between manifold buttons. Such shims 100 are not needed in the fifth embodiment of the invention. The membranes 170 are naturally alternating anion and cation permeable membranes forming alternating diluting and concentrating cells. Between any vicinal pair of concentrating cells of low electrical resistance, the membranes 170 of which are brought together between adjacent buttons 165, there is an interspersed diluting cell of high resistance. In a like manner, any concentrating cell of low resistance lies between two diluting cells of high resistance and is thus insulated. Therefore, this embodiment of the invention does away with the necessity of using insulating shims where the membranes are clamped together between manifold buttons.

The fifth embodiment of this invention shows the apparatus with four stacks of buttons 165 at each end and with the buttons 165 four times the thickness of the frames. However, there could be any number of stacks of buttons 165 at the ends of the frame provided the number of stacks corresponds to the integer multiple thickness of the buttons in relation to the thickness of the frames. The great advantage of the last embodiment of the invention is that it permits the use of particularly thick and strong buttons with large internal passages. Large internal passages greatly reduce the hydraulic resistance within the entire stack, and they are more easily and economically fabricated.

Although the fluid flow is shown in all the alternating concentrating cells in the embodiments of this invention, the intake manifold passages to the concentrating cells could, in some particular applications, be plugged up. This would result in concentrating cells having outlets only. Any inlet flow would then be dependent upon electroendosmosis alone. In addition, if it is desired, the product and the concentrate streams may be passed through a heat exchanger so that they may warm the intake streams. Since most of the waste energy in the electrodialysis apparatus is converted into heat, and since heat increases conductivity, raising the temperature of the intake streams will lower the power requirement of the electrodialysis stack. If the product and concentrate streams are not passed through a heat exchanger to warm the intake streams, this energy is wasted.

What is claimed is:

1. In an electrodialysis device, open frames stacked upon each other, membranes dispersed between said frames forming electrodialysis cells within the openings of said stacked frames, and manifold buttons each having a thickness which is an integer multiple of the thickness of a frame and containing a manifold aperture, said manifold buttons each containing at least one internal passage between the aperture and an edge of the button in communication with an electrodialysis cell, said manifold buttons being disposed in at least two aperture aligned stacks with manifold buttons of consecutive electrodialysis cells being disposed in alternate button stacks, said frames being provided with inner projections and said buttons being fixed to said projections.

2. An electrodialysis device comprising, in combination, open frames provided with inner projections and stacked upon each other, membranes interspersed between said frames forming electrodialysis cells within the openings of said frames, and manifold buttons substantially twice the thickness of said frames fixed in opposite ends of said frame openings to the inner projections of each of said frames, said manifold buttons being held in different positions by alternate frames and forming four stacks of said manifold buttons, said manifold buttons containing transverse manifold apertures aligned in each stack and said manifold buttons having internal passages communicating between the apertures in a stack of said buttons and alternate electrodialysis cells.

3. The combination according to claim 2 in which said buttons are laminated.

4. An electrodialysis stack comprising, in combination, rectangular frames having a large central opening with a recessed corner at each end of the opening, a corner projection into the large central opening adjacent to each recessed corner, each corner projection containing a manifold aperture and slots extending toward each manifold aperture from the large central opening, and button forming laminations substantially one-half the thickness of a frame fixed to each surface of each corner projection, each of said button forming laminations contained an aligned manifold aperture from which there extend slots which overlap the slots in corner projections, said frames being stacked with the button forming laminations of each frame extending into the recessed corners of the adjacent frames, and membranes interspersed between said frames forming electrodialysis cells within the openings of said frames.

5. The combination according to claim 4, wherein said frame consists of two laminated members each being of substantially the same thickness as said button forming laminates.

6. An electrodialysis device comprising, in combination, rectangular open frames stacked upon each other, membranes interspersed between said frames forming electrodialysis cells within the openings of said frames, inner projections at one end of each frame, manifold buttons substantially twice the thickness of said frames, a button being affixed to a projection of each frame, and a divider arm of the thickness of a frame extending from each manifold button part lengthwise of the frame and terminating short of the other end of the frame, said manifold buttons each containing two transverse manifold apertures and passages communicating between each manifold aperture and opposite sides of each of said divider arms, said frames being stacked so that adjacent frames are arranged with manifold buttons at opposite ends.

7. An electrodialysis device comprising, in combination, frames each having an end member containing at least two manifold apertures and slots extending from said manifold apertures to an edge of said end member, two side legs extending from the ends of said end member in the same direction as the slots in said end member, a shorter divider arm extending from said end member between the apertures in said end member, and manifold buttons forming laminates substantially one-half the thickness of said end member fixed to each surface of said end member, said button forming laminates containing manifold apertures aligned with those in the end member and slots extending from said laminate apertures which overlap the slots in the end member, said frames being stacked with the side legs of each frame extending toward the end members of adjacent frames, and membranes interspersed between said frames forming electrodialysis cells between the side legs and end members of the frames.

8. In an electrodialysis device, open frames stacked upon each other, membranes interspersed between said frames forming electrodialysis cells within the openings of said frames, and manifold buttons each having a thickness substantially four times that of a frame, inner projections on each frame, said buttons being fixed to said projections, each button having a manifold aperture, and at least one internal hydraulic passage between the manifold aperture and one electrodialysis cell, said manifold buttons being disposed in different positions within said frames and forming at least four pairs of aligned button stacks with the manifold buttons of four consecutive electrodialysis cells being disposed in a different one of said four pairs of stacks.

9. In an electrodialysis device, open frames stacked upon each other, membranes interspersed between said frames forming electrodialysis cells within the openings of said frames, projections within each of said frames, manifold buttons each having a thickness substantially four times that of a frame, each button containing a manifold aperture and at least one internal hydraulic passage between the manifold aperture and one electrodialysis cell, said manifold buttons being disposed in different positions within said frames and forming at least four pairs of aligned button stacks with the manifold buttons of four consecutive electrodialysis cells being disposed in a different one of said pairs of stacks, and two end plates, each of said end plates having at least eight surfaces to support the ends of said stacks of buttons, at least one of each two surfaces supporting a stack of said manifold buttons containing an aperture communicating with the aligned manifold apertures in the stack of manifold buttons.

10. In an electrodialysis device having open frames stacked upon each other and ion-selective membranes interspersed between said frames forming electrodialysis cells within the openings of said frames, the improvement comprising inner projections on said frames, manifold buttons each being substantially an integer multiple thickness of a frame, and being fixed to a frame projection, said buttons having fluid flow apertures and internal passages between said apertures and one electrodialysis cell, said buttons being disposed in each of said open frames in a number of aligned stacks equal to the integer multiple of button thickness, adjacent buttons in each stack clamping between them a number of adjacent membranes equal to the number of button stacks and communicating with a number of electrodialysis cells equal to one less than the number of button stacks.

11. The combination according to claim 10, wherein the improvement additionally comprises two end plates each having a surface supporting one end of a stack of said buttons, said surfaces supporting said stacks of buttons so that each of said buttons extends substantially the same distance beyond the membrane walls of the electrodialysis cell with which it has a hydraulic connection.

12. In an electrodialysis stack having flat open frames and interspersed membranes in stacked array defining electrodialysis cells, the improvement comprising an integral inner projection on a frame, and a flat manifold button removably mounted on said projection, said button being of a thickness which is an integer multiple of the frame thickness, said button having an aperture transverse to its faces and an internal passage extending from said aperture to an edge portion of the button, and said button being provided with a groove in an edge portion other than that to which the passage extends, whereby the button is removably mounted on the frame by a force fit between the button groove and the frame projection.

13. In a fluid treatment device, a plurality of substantially flat open frames and interspersed membranes, at least some of which are ion-selective, in stacked array defining fluid treatment cells, at least one integral extension of said frame into its opening, a substantially flat button of a thickness substantially an integer multiple of that of the frame removably mounted on said projection parallel to said frame, a fluid manifold aperture through and normal to the faces of said button, and at least one internal passage within and parallel to the faces of said button extending from said aperture to a free edge portion of said button within the frame.

14. The combination according to claim 13, in which the opposite faces of the button are substantially equidistant from the respectively vicinal faces of the frame.

15. The combination according to claim 14, in which each button is comprised of an even number of laminates, the frame projection is coextensive with the laminates and is provided with an aligned aperture, and the laminates are disposed equally on either face of the projection.

16. The combination according to claim 14, including a pair of frame projections and respectively mounted buttons defining a fluid inlet and a fluid outlet for the cell defined by the frame opening and its vicinal membranes.

References Cited by the Examiner
UNITED STATES PATENTS

| | | | |
|---|---|---|---|
| 2,758,083 | 8/1956 | Van Hoek et al. | 204—301 |
| 2,881,124 | 4/1959 | Tye | 294—301 |
| 2,894,894 | 7/1959 | Kressman et al. | 204—301 |

JOHN H. MACK, *Primary Examiner.*